United States Patent [19]

Zahir et al.

[11] Patent Number: 4,468,524

[45] Date of Patent: Aug. 28, 1984

[54] ALKENYLPHENYL SUBSTITUTED ACRYLATES OR METHACRYLATES

[75] Inventors: Sheik A. Zahir, Oberwil; Sameer H. Eldin, Birsfelden, both of Switzerland

[73] Assignee: Ciba-Geigy Corporation, Ardsley, N.Y.

[21] Appl. No.: 418,874

[22] Filed: Sep. 16, 1982

Related U.S. Application Data

[62] Division of Ser. No. 248,755, Mar. 30, 1981, Pat. No. 4,387,204.

[30] Foreign Application Priority Data

Apr. 11, 1980 [CH] Switzerland .................... 2787/80

[51] Int. Cl.$^3$ ............................................. C07C 69/54
[52] U.S. Cl. .................................... 560/221; 560/138; 560/140; 560/141

[58] Field of Search ................ 560/221, 138, 140, 141

[56] References Cited

PUBLICATIONS

Yokota, Kazuaki et al., Polymer Journal, vol. 8, (1976) pp. 495–505.

*Primary Examiner*—Natalie Trousof
*Assistant Examiner*—L. Hendriksen
*Attorney, Agent, or Firm*—Luther A. R. Hall

[57] ABSTRACT

This invention pertains to an acrylate or methacyrate of monohydric or dihydric, mononuclear or binuclear phenols which are substituted by allyl, methallyl or 1-propenyl groups, or hydroxyalkyl ethers thereof.

The acrylates or methacrylates of the invention can be used in compositions useful in a casting or impregnating resin, adhesive, lacquer and binder which can be cured by irradiation and/or heat.

2 Claims, No Drawings

ALKENYLPHENYL SUBSTITUTED ACRYLATES OR METHACRYLATES

This is a divisional of application Ser. No. 248,755, filed on Mar. 30, 1981, now U.S. Pat. No. 4,387,204, issued on June 7, 1983.

The present invention relates to a polymerisable and self-crosslinkable composition of monomers having olefinic unsaturation and acrylates and methacrylates of phenols which are substituted by allyl, methallyl or 1-propenyl groups.

The prepolymerisation of vinyl monomers is of technical importance for the production of liquid and curable polymer syrups with sufficient storage stability and a viscosity range suitable for further processing. These prepolymers can be used as casting or impregnating resins, adhesives, lacquers and binders for granular or fibrous materials.

For the production of the polymer syrup it is necessary to discontinue rapidly the polymerisation, which is usually initiated radically at elevated temperature. This is accomplished by rapidly lowering the temperature and/or by adding a radical inhibitor. In doing so a speedy discontinuation of the reaction must ensue, as otherwise high molecular products are obtained, which can no longer fulfill the requirements necessary for ease of processing.

A mere lowering of the temperature has the disadvantage that only small batches can be cooled quickly enough, whereas the addition of radical inhibitors can impair the later curing and the properties of the final products.

The polymer syrups are often cured with crosslinking agents, but here the disadvantage is that the properties of the basic substrates are also changed.

It is therefore highly desirable to start from polymerisable compositions in the preparation of which the prepolymerisation can be discontinued by cooling and thus affording polymer syrups with good processing properties, especially as regards the viscosity range, and from which cured products with good final properties can be obtained, but avoiding the addition of crosslinking agents in order to retain the properties of the basic substrates. It is the object of the present invention to provide such polymerisable compositions.

Accordingly, the present invention provides a polymerisable and self-crosslinkable composition of monomers having olefinic unsaturation and, if desired, conventional additives, said composition containing
(a) 1 to 99.9% by weight of at least one ethylene or propylene monomer which is substituted by polar groups or aromatic hydrocarbon groups, and
(b) 99 to 0.1% by weight of an acrylate or methacrylate of monohydric or dihydric, mononuclear or binuclear phenols which are substituted by allyl, methallyl or 1-propenyl groups, or hydroxyalkyl ethers thereof.

The composition of the invention preferably contains 50 to 99.9% by weight, most preferably 75 to 99.9% by weight, of component (a), and 0.1 to 50% by weight, preferably 0.1 to 25% by weight, of component (b).

Component (a) is an ethylene or a propylene monomer which is substituted by at least one polar group or an aromatic hydrocarbon group. Examples of polar groups are halogens such as fluorine or chlorine atoms, ether groups such as alkoxy, phenyloxy or benzyloxy, ester groups such as acyloxy or aroyloxy, or groups of the formula —COOR$^5$, wherein R$^5$ is a hydrogen atom, alkyl, cycloalkyl, aryl or aralkyl. Examples of aromatic hydrocarbon groups are phenyl, toluyl, chlorophenyl and vinylphenyl. Where the monomer contains halogen substituents, 1 to 4 hydrogen atoms in the monomer can be substituted, and, where it contains the cyano group, up to 2 hydrogen atoms which are attached to the same carbon atom. The ethylene or propylene monomer preferably contains the other substituents only singly.

Examples of monomers of component (a) are: styrene, divinylbenzene, vinyltoluene, chlorostyrene, α-methylstyrene, vinyl chloride, vinylidene chloride, vinylidene fluoride, tetrafluoroethylene, trifluorochloroethylene, vinyl fluoride, vinyl esters, vinyl ethers, acrylonitrile, methacrylonitrile, vinylidene cyanide and, in particular, acrylates or methacrylates or mono- or polyfunctional alcohols.

The monofunctional alcohols contain preferably 1 to 6 carbon atoms and the polyfunctional alcohols 2 to 6 carbon atoms.

Preferred substituted ethylene and propylene monomers which constitute component (a) are styrene, divinylbenzene, vinyl toluene, chlorostyrene, acrylonitrile, methacrylonitrile, acrylic or methacrylic acid and, in particular, acrylates or methacrylates of the formula

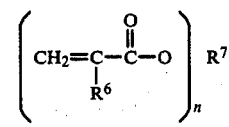

wherein R$^6$ is a hydrogen atom or methyl, n is an integer from 1 to 4, and R$^7$ is an n-valent aliphatic, cycloaliphatic or aromatic hydrocarbon atom.

If n is 1, R$^7$ can be alkyl or hydroxyalkyl containing preferably 1 to 12, most preferably 1 to 6, carbon atoms, cyclohexyl, phenyl or benzyl. Hydroxyethyl and 1,2-hydroxypropyl may be cited as examples.

If n is 2, R$^7$ can be alkylene containing preferably 2 to 6 carbon atoms, cyclohexylene, phenylene or a radical of the formula —(C$_m$H$_{2m}$O)$_x$C$_m$H$_{2m}$—, wherein m is 2 or 3 and x is 1 to 5. This latter radical is derived from poly(oxaalkylene)diols such as diethylene glycol, triethylene glycol or dipropylene glycol.

If n is 3, R$^7$ can be derived from e.g. glycerol or trimethylolpropane and, if n is 4, from pentaerythritol.

The monohydric phenols or their ethers of component (b) contain preferably 1 to 3, most preferably 2, allyl, methallyl or 1-propenyl groups, and the dihydric phenols or their ethers contain preferably 1 to 4, most preferably 2 to 4, such groups. These groups are preferably attached in both ortho-positions to the phenol oxygen atom, provided these positions are not already occupied by other groups. A third allyl, methallyl or 1-propenyl group in the monohydric phenols is preferably para-positioned to the phenol oxygen atom.

The acrylates and methacrylates which constitute component (b) in the composition of this invention are preferably derived from phenol, cresol, xylenol, brenzcatechol, resorcinol, hydroquinone, mono- or dihydroxynaphthalene, bisphenols, all of which are substituted by allyl, methallyl or 1-propenyl groups, or from their hydroxyalkyl ethers. The hydroxyalkyl group preferably has the formula R—OH, wherein R is alkylene containing preferably 2 to 6 carbon atoms or 2- hydroxypropylene. In particular, R is ethylene, 1,2-propylene or 2-hydroxypropylene.

In a preferred embodiment of the composition of this invention the esters of the component (b) have the formula I

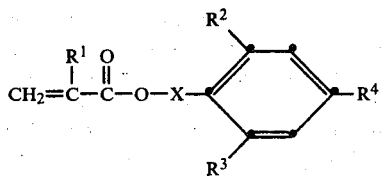

wherein $R^1$ is a hydrogen atom or methyl, X is an oxygen-carbon bond, $CH_2-CH_2-O$,

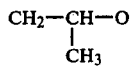

or $CH_2-CHOH-CH_2-O$, and $R^2$ is allyl, methallyl or 1-propenyl, $R^3$ is a hydrogen atom or methyl, or has the meaning of $R^2$, and $R^4$ is a hydrogen atom, methyl, allyl, methallyl, 1-propenyl or a radical of the formula

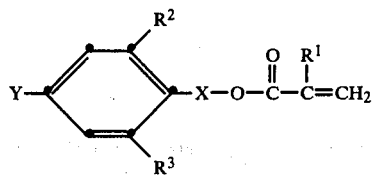

wherein X, $R^1$, $R^2$ and $R^3$ have the meanings assigned to them above, and Y is a carbon-carbon bond, alkylene of 1 to 6 carbon atoms, alkylidene of 2 to 6 carbon atoms, cycloalkylidene containing 5 or 6 ring carbon atoms, an oxygen atom, a sulfur atom or a group of the formula CO, SO or $SO_2$.

In the esters of the formula I it is preferred that $R^2$ is allyl, $R^3$ is a hydrogen atom or allyl, and $R^4$ is a hydrogen atom or a radical of the formula

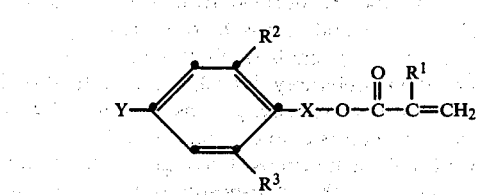

wherein $R^2$ and $R^3$ have the meanings previously assigned to them and Y is methylene, ethylidene or 2,2-propylidene.

The acrylates and methacrylates of component (b) in the composition of this invention are novel, except for 2-(o-allylphenoxy)ethylacrylate and 4-(o-allylphenoxy)-butylacrylate, which are described in Polymer Journal, Vol. 8, No. 6, pp. 495–505 (1976). The present invention also relates to the novel acrylates and methacrylates.

Preferred novel acrylates and methacrylates of monohydric phenols are e.g. those of the formula II

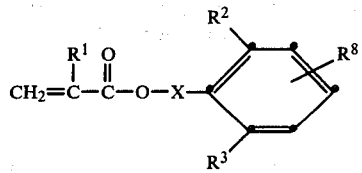

wherein X, $R^1$, $R^2$ and $R^3$ are as defined for formula I and $R^8$ is a hydrogen atom, methyl, allyl, methallyl or 1-propenyl, with the proviso that X is not $CH_2-CH_2-O$ if $R^2$ is allyl and $R^3$ and $R^8$ are a hydrogen atom. $R^3$ is preferably bound in the para-position to the X-group. X is preferably $CH_2-CHOH-CH_2-O$, $R^2$ is preferably allyl and $R^3$ is preferably allyl and, most preferably, a hydrogen atom, and $R^8$ is preferably a hydrogen atom.

Examples of compounds of the formula II are:
1-acryloyloxy- or 1-methacryloyloxy-2-allylbenzene,
1-acryloyloxy- or 1-methacryloyloxy-2,6-bisallylbenzene,
1-acryloyloxy- or 1-methacryloyloxy-2-allyl-4-methylbenzene,
1-acryloyloxy- or 1-methacryloyloxy-2-allyl-6-methylbenzene,
1-acryloyloxy- or 1-methacryloyloxy-2,4-bisallyl-6-methylbenzene,
1-acryloyloxy- or 1-methacryloyloxy-2-allyl-4,6-dimethylbenzene,
1-(3-acryloyloxy-2-hydropropyloxy)-2-allylbenzene,
1-(2-methacryloyloxyethoxy)-2-allylbenzene,
1-(1-acryloyloxy-2-methylethoxy)-2,6-diallylbenzene,
1-acryloyloxy-2-methallylbenzene,
1-(acryloyloxyethoxy)-2-(1-propenyl)benzene,
1-(1-acryloyloxy-2-hydroxypropoxy)-2-methallyl-4-methylbenzene.

A further preferred group of acrylates and methacrylates comprises e.g. those of the formula III

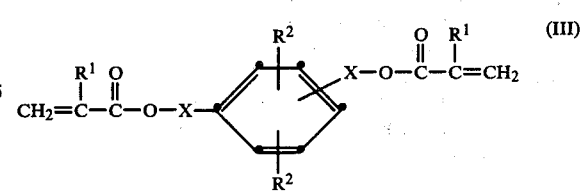

wherein X, $R^1$ and $R^2$ are as defined for formula I and at least one $R^2$ group is bound in the para- or preferably ortho-position to one of the

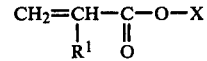

groups. X is preferably $CH_2-CHOH-CH_2-O$ and $R^2$ is preferably allyl.

Examples of these compounds are: 1,2-bisacryloyloxy-3,6-bisallylbenzene, 1,3-bisacryloyloxyethoxy-2,4-bismethallylbenzene, 1,4-bis(3-acryloyloxy-2-hydroxypropoxy), 2,5-bisallylbenzene, 1,2-bis(2-acryloyloxypropoxy)-3,5-bis-(1-propenyl)benzene and their analogous methacrylates.

A particularly preferred group of acrylates and methacrylates comprises those of the formula IV

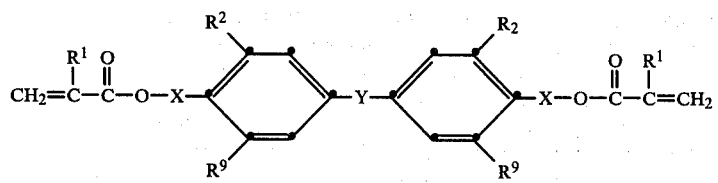
(IV)

wherein X, Y, $R^1$ and $R^2$ are as defined for formula I and $R^9$ is a hydrogen atom or has the meaning of $R^2$.

Preferred compounds of the formula IV are those in which X is $CH_2$—CHOH—$CH_2$—O, $R^2$ is allyl or methallyl and X is alkylidene of 1 to 4 carbon atoms such as methylene, ethylene, 1,1- or 2,2-propylidene, 1,1- or 2,2-butylidene, a carbon-carbon bond, cyclohexylidene or an oxygen atom. Y is in particular alkylidene of 1 to 4 carbon atoms.

Examples of acrylates and methacrylates of the formula IV are:
4,4'-bisacryloyloxy-3,3'-bisallyl-diphenyl,
4,4'-bisacryloyloxy-3,3'-bismethallyl-diphenyl ether,
4,4'-bis(1-acryloyloxy-2-methylethoxy)-3,5,3',5'-tetraallyl-diphenyl sulfide
4,4'-bis(1-acryloyloxy-2-hydroxypropoxy)-3,3'-bis(1-propenyl)-diphenyl sulfoxide,
bis-(4-acryloyloxy-3,5-dimethallylphenyl)carbonate,
bis-(4-acryloyloxy-3,5-diallylphenyl)methane,
1,1-bis-[4-acryloyloxy-3-(1-propenyl)-phenyl]ethane,
1,2-bis-[4-(acryloyloxyethoxy)-3,5-dimethyallyl-phenyl]ethane,
2,2-bis-(4-acryloyloxy-3-allylphenyl)propane,
2,2-bis(4-acryloyloxy-3,5-diallylphenyl)propane,
2,2-bis(4-acryloyloxyethoxy-3-allylphenyl)propane,
2,2-bis[4-(2-acryloyloxy-2-methylethoxy)-3-methallyl-phenyl]propane,
2,2-bis[4-(1-acryloyloxy-2-hydroxypropoxy)-3-allyl-phenyl]propane,
2,2-bis[4-(1-acryloyloxy-2-hydroxypropoxy)-3,5-diallylphenyl]propane,
1,1-bis[4-(1-acryloyloxy-2-hydroxypropoxy)-3-allyl-phenyl]cyclohexane,
and their analogous methacrylates.

The acrylates or methacrylates of component (b) of the composition of the invention can be obtained by methods which are known per se.

The starting allyl- and methallyl-substituted mono- and dihydric phenols can be obtained by etherifying the corresponding unsubstituted phenols with allyl chloride and then subjecting them to a Claisen rearrangement. If it is desired to introduce more allyl or methallyl groups, then this reaction will be repeated as often as necessary for the purpose. For the most part, first the ortho-positions and then the para-positions to the hydroxyl group are substituted. The corresponding (1-propenyl)-substituted phenols can be obtained by isomerisation of the allyl-substituted phenols by treatment with alkalies. The manufacture of these starting materials is described in British patent application No. 2,012,780A.

The acrylates or methacrylates of the substituted phenols which constitute component (b) of the composition of this invention can be obtained by conventional esterification of the phenols with acrylic acid or methacrylic acid or their ester-forming derivatives such as acid esters, acid anhydrides and, in particular, acid halides, in the presence of an inert solvent (hydrocarbon or ether), or without a solvent, in the temperature range from e.g. 0° to 150° C., if desired in the presence of an esterification or transesterification catalyst.

Acrylates or methacrylates of the corresponding hydroxyalkylated phenols are obtained by starting from the hydroxyalkyl ethers, which are obtained e.g. by the following methods. On the one hand, the phenols containing allyl, methallyl or 1-propenyl groups or their alkali salts can be reacted with haloalcohols, e.g chloroethanol, 1-chloro-3-hydroxypropane, 1-bromo-2-hydroxypropane, 1-chloro-4-hydroxybutane, epichlorohydrin, 1-chloro-6-hydroxyhexane, 1-chloro-4-hydroxyhexane. This method is described e.g. in Polymer Journal Vol. 8, No. 6, pp. 495–505 (1976). Alkyl-substituted hydroxyethyl ethers can be obtained by addition of the corresponding 1,2-epoxides by conventional methods to the substituted phenols. Examples of 1,2-epoxides are ethylene oxide, 1,2-propylene oxide, 1,2- or 2,3-butylene oxide, 1,2- or 2,3-pentylene oxide, 1,2-, 2,3- or 3,4-hexylene oxide.

The corresponding acrylates or methacrylates of the hydroxyalkyl ethers mentioned above can in turn be obtained by the conventional esterification or transesterification methods above. When esterifying dihydroxyalkyl ethers, for example 2,3-dihydroxypropyl ethers, mainly only the hydroxyl group is esterified.

The acrylates or methacrylates of 2,3-dihydroxypropyl ethers can also be obtained by other known methods. For example, the correspondingly substituted phenols are converted firstly into the glycidyl ethers, which are then reacted with acrylic or methacrylic acid, or glycidyl acrylates or methacrylates can be reacted with the substituted phenols. In the process, the molar ratios of the reactants depend substantially on the number of glycidyl ether groups or phenolic hydroxyl groups. The addition of epoxides is preferably carried out without a solvent and with the addition of a catalyst, e.g. a quaternary ammonium salt, in the temperature range from 50° to 200° C.

The acrylates and methacrylates of component (b) are colourless to pale brown liquid, viscous or resinous substances which are soluble in conventional organic solvents. Their reactivity is good and they are stable to storage after addition of polymerisation inhibitors. They can be mixed as prepolymers or direct with activated ethylene or propylene monomers to give polymerisable compositions which are miscible over the whole range.

These compositions can be readily polymerised by conventional methods, as the known chain-terminating action of allyl, 1-propenyl and methallyl groups (mesomeric stabilisation) surprisingly has almost no influence on the reactivity of the composition. Owing to the different reactivity of the polymerisable groups in the composition, a step by step curing by identical or different initiation (thermal or photolytic) is also possible and crosslinked polymers can be obtained without the addition of crosslinking agents. It is particularly advantageous that a prepolymerisation and subsequent discontinuation of the reaction by simple lowering of the temperature makes it possible to obtain polymer syrups in a viscosity range which is suitable for further processing. The properties of the cured final products are only little changed in comparison to the properties of the basic resin.

The polymerisation of the compositions of this invention is carried out by the methods commonly employed in the art by radical or ionic initiation.

The radical polymerisation can be effected by thermal or photochemical excitation (light, γ-irradiation, electron emission), usually with the addition of radical initiators, e.g. inorganic or organic peroxides or azo compounds, or photoinitiators, e.g. organic peroxides and hydroperoxides, α-haloacetophenones, benzoin or its ethers, benzophenones, benzilacetals, anthraquinones, arsines, phosphines or thioureas.

The cationic polymerisation is initiated with inorganic or organic acids or Lewis acids, e.g. sulfuric acid, perchloric acid, phosphoric acid, sulfonic acid, boron trifluoride, aluminium trifluoride, titanium tetrachloride, tin tetrachloride or antimony pentachloride. Examples of initiators for the anionic polymerisation are alkali alcoholates, alkali hydroxides or alkali amides. The initiators are normally added in amounts of 0.01 to 10% by weight, preferably 0.05 to 5% by weight, based on the composition consisting of component (a) and component (b).

The compositions of this invention can contain conventional additives, e.g. fillers, processing assistants, stabilisers, flame retardants, reinforcing agents or light stabilizers.

The compositions of the invention are particularly suitable in liquid form for e.g. the surface coating of substrates such as metals (iron, aluminium, copper), glass, ceramics, paper or wood. By photopolymerising the light-sensitive composition through a mask and subsequent development, layers applied to supports can also be used for the production of printing plates or printed circuits. Methods of producing printing plates and printed circuits are described e.g. in British patent specification No. 1,495,746.

The compositions may also be used as adhesives for bonding identical or different materials such as metals, ceramics, glass, rubber, plastics, paper and wood. Curing can be effected by heating and, when using transparent materials, also by irradiation.

The compositions of this invention can also be used for the production of fibre-reinforced composites. The reinforcing fibres made e.g. of glass, carbon or asbestos, are impregnated with the liquid composition and then cured by irradiation and/or heating. In addition, the compositions are also suitable for the production of hollow objects by the filament winding method and for use as casting and impregnating resins.

The compositions of the invention are conveniently prepared before their application by mixing the individual components and, depending on the end use, can be diluted with conventional solvents and mixed with further additives. Depending on the end use it can be advantageous first to react the compositions to form polymer syrups and then to apply these latter. The prepolymerisation up to e.g. 100° C. and subsequent cooling can be effected by photohardening or thermosetting. It is advantageous to add further polymerisation initiators to the polymer syrups before the further processing.

The thermosetting to give the final products is in general carried out in the temperature range from 50° to 200° C. However, it is also possible to proceed stepwise by carrying out a photopolymerisation in a first step and thermosetting in a second one. In this case it is advantageous to add both photoinitiators and radical initiators or ionic catalysts to the compositions.

The cured final products are self-crosslinked hard plastics materials with good mechanical properties. The self-crosslinking is especially advantageous for the production of organic glass.

The invention is further illustrated by the following Examples, in which percentages are by weight.

(A) MANUFACTURE OF THE STARTING MATERIALS

Example 1

A mixture of 103 g of 2,2-bis(3-allyl-4-hydroxyphenyl)propane, 95 g of glycidyl methacrylate, 0.8 g of 2,5-di-tert-butyl-p-cresol and 0.4 g of tetramethylammonium chloride is heated to 110° C. and then kept at this temperature for 3½ hours. After this time the epoxide content was negligible. The product consists substantially of 2,2-bis[3-allyl-4-(methacryloyloxy-2-hydroxypropoxy)phenyl]propane.

Example 2

82 g of 2,2-bis(3-allyl-4-glycidyloxyphenyl)propane with an epoxide content of 4.7 equivalents/kg are heated to 100° C. in the presence of 0.35 g of tetramethylammonium chloride and 0.23 g of 2,6-di-tert-butyl-p-cresol. Then 34 g of methacrylic acid are added dropwise in the course of 1 hour and the mixture is stirred for a further 3½ hours at 100° C. After this time the epoxide content is negligible and the residue corresponds to the compound of Example 1 and is a liquid with a viscosity of 108 Pas.

Example 3

40.3 g of methacryloyl chloride are added dropwise in the course of 1 hour to a stirred mixture of 68.5 g of the disodium salt of 2,2-bis(3-allyl-4-hydroxyphenyl)propane, 250 ml of toluene and 0.12 g of 2,6-di-tert-butyl-p-cresol, while keeping the temperature at 45° C. The mixture is stirred for a further 2½ hours and then filtered, and the solvent is removed from the filtrate by vacuum distillation. The residue consists substantially of 2,2-bis[3-allyl-4-(methacryloyloxy)-phenyl]propane and is an almost colourless liquid with a viscosity of 3.6 Pas.

Example 4

A mixture of 194 g of 2,2-bis(3,5-diallyl-4-hydroxyphenyl)propane, 154 g of glycidyl methacrylate, 0.7 g of tetramethylammonium chloride and 2.8 g of 2,6-di-tert-butyl-p-cresol is heated in the course of 1 hour to 95° C. and stirred for a further 3½ hours at this temperature. The reaction product consists substantially of 2,2-bis[3,5-diallyl-4-(3-methacryloyloxy-2-hydroxypropoxy)-phenyl]propane.

Example 5

A mixture of 49.2 g of 2,2-bis[3-(1-propenyl)-4-(methacryloyloxy)-phenyl]propane, 0.1 g of tetramethylammonium chloride and 0.15 g of hydroquinone is heated to 80° C. Then 20.4 g of methacrylic acid are added dropwise in the course of 1 hour and the mixture is stirred for a further 8 hours at 80° C. The reaction product is 2,2-bis[3-(1-propenyl)-4-methacryloyloxy-2hydroxypropoxy)phenyl]propane.

Examples 6-13

A mixture of starting material, benzyl triethylammonium chloride as catalyst, and an inhibitor is heated to 110° C. and then acrylic or methacrylic acid is added dropwise. The reaction is allowed to continue until the mixture has an acid value of at most 0.1 equiv./kg. Further particulars are listed in Table I.

tert-butyl-p-cresol, and 450 g of methylmethacrylate are charged into a 750 ml sulfonating flask and a weak flow of nitrogen is introduced. With stirring, the mixture is heated to 90° C. and then 5 g of dibenzoyl peroxide (50% solution in dibutyl phthalate) are added. The mixture is then kept at 90° C. until it has a viscosity of about 100 mPas (90° C.). The time taken is about 47–58 minutes. The mixture is then cooled to room temperature

TABLE 1

| Example | Product | Amount of starting material (g) Epoxide content (equiv./kg) | Amount of acrylic acid (g) | Amount of methacrylic acid (g) | Amount of catalyst (g) | Amount of initiator (g) | Reaction product Epoxide content (equiv./kg) | Carboxyl content (equiv./kg) | $\eta 25°$ C. (cP) |
|---|---|---|---|---|---|---|---|---|---|
| 6 | 800 g of O—allyl-phenylglycidyl ether | 4.94 | — | 323 | 1.72 | 1.12 TBPC[1] 0.56 PH[2] | 0.31 | 0.09 | 100 |
| 7 | 800 g of O—allyl-phenylglycidyl ether | 4.94 | 272 | — | 1.72 | 1.08 PH | 0.37 | 0.03 | 170 |
| 8 | 800 g of O—(1-propenyl)-phenyl-glycidyl ether | 4.98 | — | 326 | 1.73 | 1.13 TBPC 0.56 Ph | 0.25 | 0.06 | 1290 |
| 9 | 800 g of O—(1-propenyl)-phenyl-glycidyl ether | 4.98 | 272 | — | 1.72 | 1.08 TBPC 0.54 PH | 0.37 | 0.03 | 3260 |
| 10 | 800 g of O,O'—diallyl-bisphenol-A-diglycidyl ether | 4.41 | — | 289 | 1.53 | 1.09 HQ[3] 1.09 PH | 0.29 | 0.1 | resin |
| 11 | 800 g of O,O'—diallyl-bisphenol-A-diglycidyl ether | 4.41 | 242 | — | 1.52 | 1.04 HQ 1.04 PH | 0.32 | 0.09 | resin |
| 12 | 800 g O,O'—di(1-propenyl)-bisphenol-A-diglycidyl ether | 4.45 | — | 291 | 1.54 | 1.09 HQ 1.09 PH | 0.24 | 0.05 | resin |
| 13 | 800 g O,O'—di(1-propenyl)-bisphenol-A-diglycidyl ether | 4.45 | 244 | — | 1.54 | 1.04 HQ 1.04 PH | 0.30 | 0.08 | resin |

[1]TPBC = di-tert-butyl-p-cresol
[2]PH = phenothiazine
[3]HQ = hydroquinone

(B) APPLICATION EXAMPLES

Example 14

Polymer syrups are initially prepared from the following compounds and then processed to mouldings:
O-allyl-(1-acryloyloxy-2-hydroxypropoxy)benzene (A),
O-allyl-(1-methacryloyloxy-2-hydroxypropoxy)benzene (B),
O-(1-propenyl)-(1-acryloyloxy-2-hydroxypropoxy)benzene (C),
O-(1-propenyl)-(1-methacryloyloxy-2-hydroxypropoxy)benzene (D),
50 g of one of these compounds, which are stabilised with 500 ppm of phenothiazine and 1000 ppm of 2,5-di-tert-butyl-p-cresol, and 450 g of methylmethacrylate are charged into a 750 ml sulfonating flask and a weak flow of nitrogen is introduced. With stirring, the mixture is heated to 90° C. and then 5 g of dibenzoyl peroxide (50% solution in dibutyl phthalate) are added. The mixture is then kept at 90° C. until it has a viscosity of about 100 mPas (90° C.). The time taken is about 47–58 minutes. The mixture is then cooled to room temperature immediately with an ice-water bath.

A glass plate mould is then filled with the respective polymer syrup using a syringe and ensuring that no bubbles form. The syrups are then cured for 8 hours at 80° C. and for 6 hours at 100° C. After cooling, the mouldings are removed from the mould. Glass-like sheets of high gloss and excellent transparency are obtained.

The properties of the mixture, of the polymer syrup and of the cured mouldings are reported in Tables II to IV. For comparison, the properties of methylmethacrylate (MMA), stabilised with 500 ppm of phenothiazine and 1000 ppm of 2,5-di-tert-butyl-p-cresol and prepared in the same manner, are also reported.

TABLE II

| | Properties of the mixture | | | | |
|---|---|---|---|---|---|
| | | Mixture | | | |
| Property | MMA | 90% MMA 10% A | 90% MMA 10% B | 90% MMA 10% C | 90% MMA 10% D |
| Viscosity 25° C. (mPas) | 0.8 | 0.9 | 1.0 | 0.9 | 0.9 |
| Storage stability 60° C. (days) | >48 | >48 | >48 | >48 | >48 |

TABLE III

| | Properties of the polymer syrup | | | | |
|---|---|---|---|---|---|
| | | Mixture | | | |
| Property | MMA | 90% MMA 10% A | 90% MMA 10% B | 90% MMA 10% C | 90% MMA 10% D |
| Gel time (90° C.) | 55'45" | 57'10" | 57'05" | 63'00" | 55'30" |

TABLE III-continued

Properties of the polymer syrup

| Property | MMA | Mixture 90% MMA 10% A | 90% MMA 10% B | 90% MMA 10% C | 90% MMA 10% D |
|---|---|---|---|---|---|
| DIN 16945 reaction time until formation of the syrup (min) | 52 | 47 | 54 | 54 | 58 |
| viscosity | | | | | |
| 25° C. (mPas) | 865 | 1550 | 590 | 2430 | 980 |
| 40° C. (mPas) | 160 | 215 | 135 | 305 | 175 |
| storage stability (25° C.) number of hours until the viscosity doubles | 189 | 70 | 138 | 114 | 126 |

TABLE IV

Properties of the cured products

| Property | MMA | Mixture 90% MMA 10% A | 90% MMA 10% B | 90% MMA 10% C | 90% MMA 10% D |
|---|---|---|---|---|---|
| Glass transition temperature (°C.) | 128 | 112 | 115 | 116 | 117 |
| Shore hardness | 87 | 87 | 88 | 88 | 87 |
| loss in volume (%) | 4.8 | 4.6 | 4.9 | 4.2 | 4.6 |
| bending strength | | | | | |
| N/mm | 86.5 | 75.5 | 76.9 | 81.4 | 86.3 |
| 95% range | 74.8–98.2 | 72.5–78.5 | 73.5–80.3 | 76.6–86.2 | 84.3–88.3 |
| deflection | | | | | |
| mm | 7.9 | 5.8 | 6.6 | 5.9 | 6.9 |
| 95% range | 6.5–9.3 | 5.4–6.2 | 5.7–7.5 | 5.3–6.5 | 6.1–7.7 |
| impact strength | | | | | |
| k y/m² | 10.1 | 10.4 | 9.4 | 9.7 | 9.7 |
| 95% range | 8.9–11.3 | 9.0–11.8 | 8.6–10.2 | 8.4–11.0 | 8.4–11.0 |

Example 15

220 g of one of the following compounds are heated briefly to 60°–70° C., stirred with 180 g of styrene, cooled to room temperature and filled into moulds (each mixture contains 1000 ppm of hydroquinone and phenothiazine as inhibitors):

2,2-bis[3-allyl-4-(1-acryloyloxy-2-hydroxypropoxy)-phenyl]propane (E)

2,2-bis[3-allyl-4-(1-methacryloyloxy-2-hydroxypropoxy)phenyl]propane (F)

2,2-bis[3-(1-propenyl)-4-(1-acryloyloxy-2-hydroxy-propoxy)phenyl]propane (G)

2,2-bis[3-(1propenyl)-4-(1-methacryloyloxy-2-hydroxy-propoxy)phenyl]propane (H).

The properties of the mixtures are reported in Table V. To the mixtures are added, as catalyst system I, 2.0 parts of benzoyl peroxide (50% solution in dibutyl phthalate) and 0.2 part of dimethyl aniline (10% solution in dibutylphthalate) and, as catalyst system II, 2.0 parts of methyl ethyl ketone peroxide (50% solution in dibutylphthalate), 3.0 parts of cobalt octoate (1% solution in dibutyl phthalate) and 0.5 part of dimethyl aniline (10% solution in dibutyl phthalate).

The mixture containing catalyst system II is filled into moulds and cured for 24 hours at room temperature and for 8 hours at 100° C. The properties of the mouldings are reported in Table VI.

TABLE V

| Property | styrene with E | styrene with F | styrene with G | styrene with H |
|---|---|---|---|---|
| storage tability (No. of days at 60° C.) | >15 | >15 | >15 | >12 |
| viscosity | | | | |
| 25° C. mPas | 13 | 12 | 22 | 20 |
| 40° C. mPas | 7 | 7 | 11 | 9 |
| Gel time at 80° C. DIN 16945 catalyst system I | 10'30" | 14'15" | 5'10" | 9'20" |
| Gel time at 25° C. DIN 16945 (min) catalyst system II | 51 | 101 | 19 | 66 |

TABLE VI

Properties of the cured products

| Property | sytrene with E | styrene with F | styrene with G | styrene with H |
|---|---|---|---|---|
| Glass transition temperature (°C.) | 99 | 109 | 125 | 128.5 |
| bending strength | | | | |
| N/mm² | 90.0 | 97.2 | 84.1 | 81.7 |
| 95% range | 85.2–94.5 | 91.7–102.7 | 74.7–93.5 | 74.1–89.3 |
| deflection | | | | |
| mm | 7.6 | 5.8 | 4.2 | 3.6 |
| 95% range | 6.4–8.8 | 5.0–6.6 | 3.6–4.8 | 3.1–4.1 |
| impact resistance | | | | |
| k y/m² | 9.5 | 7.0 | 5.8 | 6.6 |
| 95% range | 8.0–11.5 | 4.7–9.3 | 4.2–7.4 | 5.6–7.6 |

What is claimed is:

1. An acrylate or methacrylate of the formula I

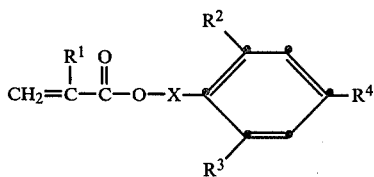

wherein $R^1$ is a hydrogen atom or methyl, X is —CH$_2$CHOHCH$_2$O—, $R^2$ is allyl, methallyl or 1-propenyl, $R^3$ is a hydrogen atom or methyl or has the meaning of $R^2$, and $R^4$ is a hydrogen atom, methyl, methallyl, allyl or 1-propenyl.

2. An acrylate or methacrylate of the formula I

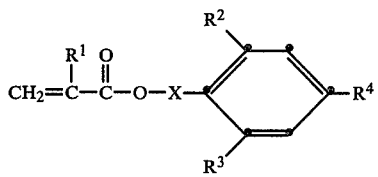

wherein $R^1$ is a hydrogen atom or methyl, X is an oxygen-carbon bond, CH$_2$—CH$_2$—O,

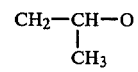

or CH$_2$—CHOH—CH$_2$—O, and $R^2$ is allyl, methallyl or 1-propenyl, $R^3$ is a hydrogen atom or methyl or has the meaning of $R^2$, and $R^4$ is a radical of the formula

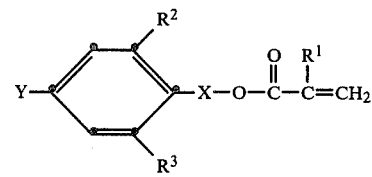

wherein X, $R^1$, $R^2$ and $R^3$ have the meanings assigned to them above, and Y is a carbon-carbon bond, alkylene of 1 to 6 carbon atoms, alkylidene of 2 to 6 carbon atoms, cycloalkylidene containing 5 or 6 ring carbon atoms, an oxygen atom, a sulfur atom or a group of the formula CO, SO or SO$_2$.

* * * * *